United States Patent Office 3,394,927
Patented July 30, 1968

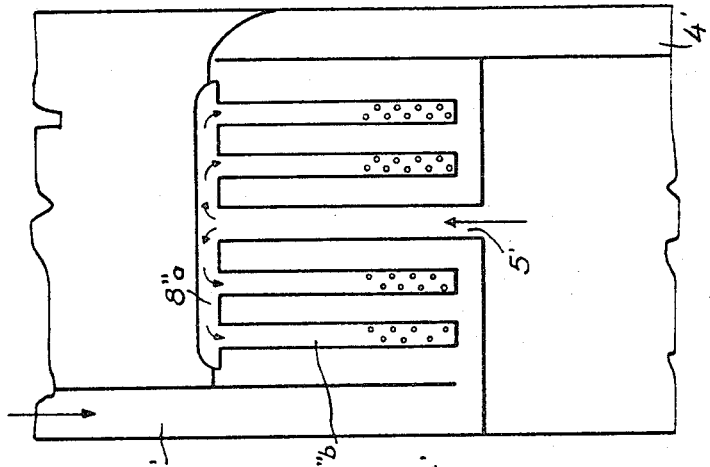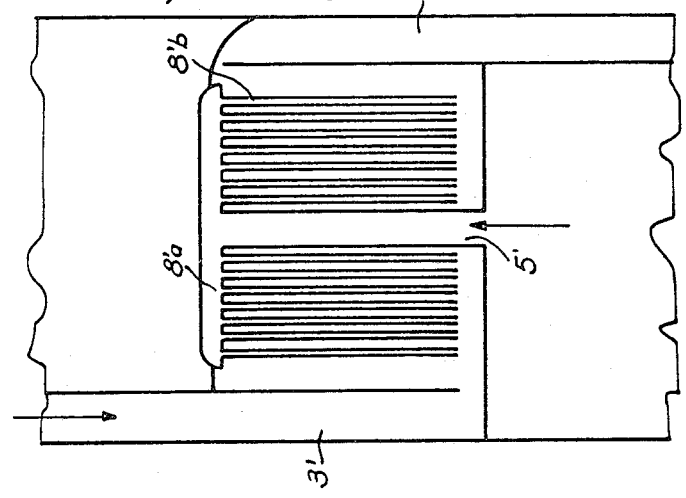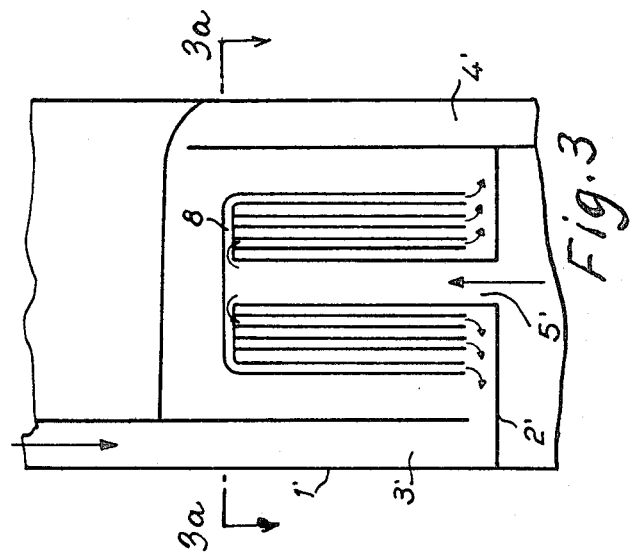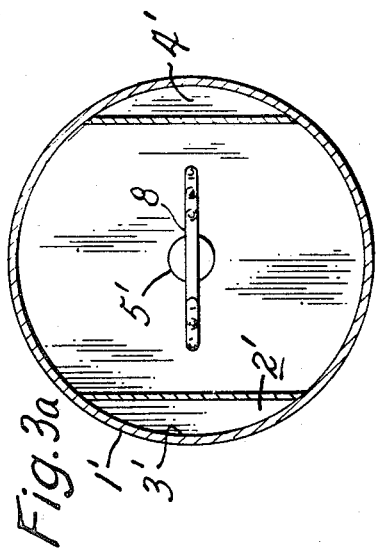

3,394,927
TRAY FOR GAS-LIQUID CONTACT COLUMNS
Jean-Marie Lerat, Paris, Michel Rostaing, Orsay, and Yves Bourgeois, Vermelles, France, assignors to Houillères du Bassin du Nord & du Pas-de-Calais, Douai, Nord, France, and Commissariat à l'Energie Atomique; Compagnie de Construction Mecanique Procedes Sulzer, and l'Air Liquide, Societe pour l'Etude et l'Exploitation des Procedes Georges Claude, Paris, Seine, France
Filed June 10, 1964, Ser. No. 374,198
Claims priority, application France, June 10, 1963, 937,500, Patent 1,373,686
2 Claims. (Cl. 261—114)

ABSTRACT OF THE DISCLOSURE

A gas-liquid contact column having horizontal exchange trays which retain a liquid level. Gas supplied to the bottom of the trays travels upwardly through a vertical shaft in the tray. Distribution tubes connected to the vertical shaft direct the flow of gas downwardly and release it in bubbles beneath the liquid surface.

---

Columns employing conventional trays generally comprise a vertical cylinder separated into compartments by horizontal bubble trays or horizontal perforate plates. The liquid is supplied to the top tray via a feed conduit and the overflow from this tray can flow into the tray situated therebeneath via a vertical discharge chute. In the case of bubble trays, the gas rising in the column bubbles through the liquid of each tray since the apertures of each tray are capped by bell-shaped elements which are immersed in the liquid of that tray. In the case of perforate trays the gas rising through the column passes through the perforations in each tray and bubbles through the liquid on the tray.

In the industrial application of isotope exchange reactions, for example for the production of heavy water, contact systems must be used which enable the required isotope to pass from the gas phase to the liquid phase (or conversely) with maximum efficiency. Isotope separation requires a large number of theoretical plates and the use of contact systems of inadequate efficiency would require the use of many contact systems so that the installation would be of excessive dimensions, difficult to operate and of a prohibitive cost.

Perforate trays are frequently preferred to bubble trays because of a higher specific rate of flow, lower pressure drop and better mass transfer efficiency than in the case of the bubble tray.

As compared with this, the bubble tray has a wider stability range and better liquid retention.

It has already been proposed to associate a conventional bubble tray with a perforate plate connected to the central cap of the shaft, but such an association does not combine the characteristics of perforate trays with those of bubble trays.

It is an object of the present invention, therefore, to provide an improved high liquid level tray for a gas-liquid contact column combining the characteristics of a perforate tray as regards efficiency with the advantage of the bubble tray as regards better liquid retention.

To this end, the tray according to the invention comprises essentially a solid plate to which the liquid phase is fed, said plate having one or more vertical gas phase feed shafts of a relatively appreciable height of at least 7 cm., said shaft or shafts each being connected at their top to a gas phase distributor system which discharges near said solid plate.

In one embodiment of the tray according to the invention, the gas phase distributor system is in the form of a cap which caps and surrounds the vertical shaft and which is also connected at the bottom to a perforate plate disposed above the solid plate.

In a preferred embodiment of the tray according to the invention, the gas phase distributor system comprises a nest of tubes connected radially to the top of the shaft and bent down to terminate close to the solid plate, so that said tubes discharge near the said solid plate.

In another preferred embodiment of the tray according to the invention, the gas phase distributor system is formed by a top can disposed around the shaft and continued downwardly to terminate close to the solid plate by a nest of vertical tubes open at their free ends.

According to a variant of this latter embodiment, the vertical tubes are closed at their free ends but are perforated over a certain height of their side wall.

In order that the invention may be more fully understood, certain preferred embodiments thereof will now be described, by way of example only, with reference to the accompanying drawings, in which:

FIGURES 3 to 5 are diagrammatic elevations in section of various alternative embodiments of the invention.

FIG. 3a is a vertical sectional view of FIG. 3.

Figure 1:
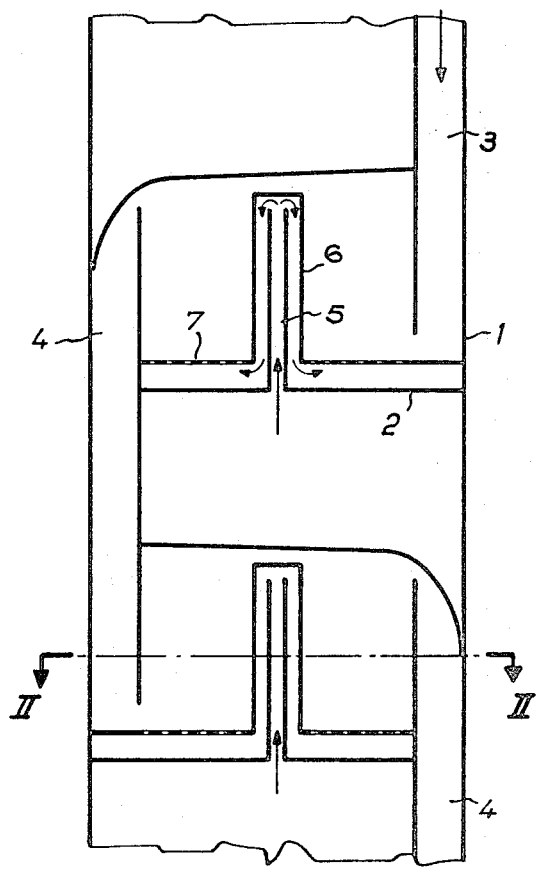
FIGURE 1 is a diagrammatic elevation in section showing a contact column provided with trays according to the invention.
Figure 2:
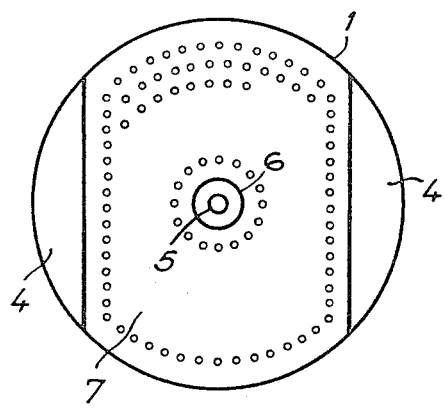
FIGURE 2 is a section on the line II—II in FIGURE 1.

With reference to FIGURES 1 and 2 of the drawings, the column comprises a vertical cylinder 1 which is separated into compartments by a number of solid trays 2, to which liquid is fed via a feed chute 3 and from which liquid is discharged via a discharge chute 4. Each tray comprises one or more gas feed shafts 5 of a similar design to the conventional bell-shaped elements of a bubble tray but of a much greater height, the height being at least 7 cm. Each shaft is capped by a cap 6 which surrounds the shaft and the bottom part of which is connected to a perforate plate 7, the perforations of which have the normal characteristics (apertures, pitch) of a conventional perforate plate. Sealing-tightness between the tray 2 and the walls of the contact column cylinder 1 is obtained in the same way as with a conventional tray.

For a small gas flow (and for zero flow) the liquid is supported by the tray 2, the level of the liquid being regulated by the height of the shaft and of the discharge chute.

As the rate of flow of gas increases, it rises in the shaft, turns down into the annular space between the shaft and the cap, then into the space between the tray 2 and the plate 7, is distributed throughout the apertures of the perforate plate and, as the rate of flow increases, it expels the liquid from the space between the tray and the perforate plate. For a given rate of flow, all the liquid is on the top perforate plate which acts exactly as a conventional perforate plate but with a much greater height of liquid, about some tens of centimetres, as will be seen hereinafter.

A column provided with trays as shown in FIGS. 1 and 2 was used for a deuterium isotope exchange process between liquid ammonia and ammonia synthesis gas under the following operating conditions:

Operating pressure: 500 kg. per sq. cm.
Temperature: −30° C.
Catalyst concentration: 4% by weight ($KNH_2$)
Inside diameter of contact column: 32 cm.
Rate of flow of gas: 2500 cubic metres per hour NTP ($N_2+3H_2$).

The perforated trays included the following features:

Total section reserved for feed chute and discharge chute: 100 sq. cm.
Diameter of apertures: 0.2 cm.
Pitch: 4
Perforate area: 6% of perforable area
Number of caps: 1
Free shaft section: 15.4 sq. cm. (diameter=1.4 cm.)
Free cap section: 36 sq. cm. (diameter=2.3 cm.)
Height of liquid on perforate plate: 30 cm. (6 times that of the conventional tray).

The measured efficiency of the column was 12.5% with an estimated 85% tray obstruction and an inter-tray spacing of about 1.20 meters, corresponding to an equivalent height of a theoretical plate of 9 to 10 meters. This efficiency is several times that which would be obtained with a conventional tray operated under similar conditions.

In the embodiment shown in FIGURE 3 of the drawings, the tray is formed of a solid plate 2' having a central gas feed shaft 5' which is radially continued at the top by a gas distributor 8 formed by a nest of small-diameter tubes disposed with a regular pitch and bent down to terminate close to the tray 2'. These tubes dip into the liquid on the tray where they distribute the gas and disperse it finely within the liquid phase. The liquid supply 3' to the contact system and the discharge chute 4' are of conventional type.

It will readily be seen that it is impossible for the tray to sweat and the liquid level retained is regulated by the height of the discharge chute and the length of the gas phase distributing tubes.

A column provided with trays as shown in FIG. 3 was used in a $NH_3$—($N_2+3H_2$) exchange process under the operating conditions defined above. The gas phase distributing tubes of the trays had a diameter of 0.4 cm., the tubes had a pitch of 4 and a liquid level of 40 cm. was maintained on the trays. Under the above conditions a basic efficiency of 12% was measured under conditions corresponding to an equivalent height of a theoretical plate of 11 to 12 meters. Again this is an improvement in the efficiency available from conventional trays.

Equivalent height of theoretical plate: approximately 11–12 m.

A variant of this embodiment of the tray according to the invention is shown in FIGURE 4 of the drawing; the gas distributor is formed by a top cap 8'a disposed around the shaft 5', the lower part of the cap being provided with a nest of vertical tubes 8'b.

A second varient of this embodiment of the plate according to the invention is shown in FIGURE 5, in which the tubes 8"b for distributing the gas into the liquid phase are closed at the bottom and are perforated over a certain length of their side walls.

A column using conventional perforate trays and a column provided with trays according to FIG. 5, were used by way of comparison in an installation for hydrodynamic studies operated according to the simple air-water process and under the following operating conditions:

Inside diameter of contact column: 31 cm.
Rate of flow of gas: up to 300 cubic metres per hour.

The conventional perforate reference tray has the following features:

Aperture diameter: 0.2 cm.
Pitch: 4
Perforate area: about 4% of perforable area
Inter-tray spacing: 120 cm.

The tray according to FIG. 5 and made of stainless steel, has the following features:

10 gas distributor tubes of a mean diameter of 2 cm.
Height of perforate portion: 5 cm.
Height of shaft (including cap): 70 cm.
Inter-tray spacing: 120 cm.

Figure 6:
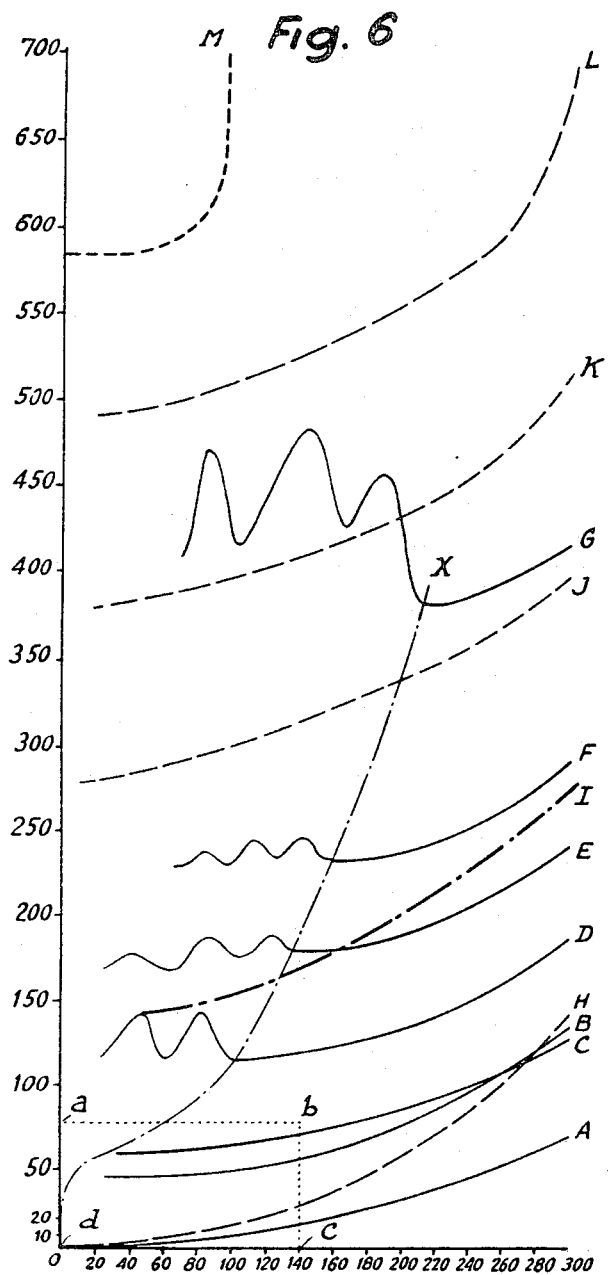
FIGURE 6 is a graph illustrating curves showing the submergence level in millimetres of the liquid phase—in this case water—against the rate of flow of the gas phase—in this case air—in cubic metres per hour for high-submergence trays according to the invention as compared with conventional reference trays of similar characteristics.

The results of tests carried out with conventional perforate tray column and with the column provided with trays according to FIG. 5 are shown in the graph of FIG. 6.

Curves A to G show, in millimetres of water, the variations of pressure losses against the rate of flow of gas (air) in cubic metres per hour from a starting submergence height (level of liquid (water)) on the tray respectively equal to 0, 30, 50, 100, 150, 200 and 300 mm. in the conventional perforate tray column. The curves H to M show in millimetres of water the variations of the pressure losses against the rate of flow of gas in cubic metres per hour from respective submergence heights of 0, 150, 300, 400, 500 and 600 millimetres respectively in the column provided with trays according to the invention.

It will be apparent from the graph that with the conventional perforate tray column instability occurs after a submergence height of 70 mm. (region bounded by the instability curve X of the conventional reference perforate tray). After a submergence height of 300 mm. the conventional perforate tray can no longer function irrespective of the rate of flow of the gas.

The usual area of use of conventional perforate tray columns is bounded in the graph shown in FIG. 6 by the rectangle abcd (submergence height from 0 to 70, and rate of flow of gas from 0 to 140 cubic metres per hour).

For the high-submergence plate according to the invention, the submergence height may be as much as about 500 mm. Also for curves A and H (dry trays), the pressure losses are very different.

However, as the height of submergence of the liquid increases, the pressure losses tend to reach the same order of magnitude, and in some cases (see curves J and G in FIG. 6), the loss of pressure of the conventional perforate tray is even higher than that of the tray which is the object of this invention.

With regard to the exchange efficiency, the same trays as above have been tested in an installation under pressure for isotope exchange $NH_3$—$H_2$. It has been noticed that for the same submergence height, the exchange efficiency of the tray according to the invention (FIG. 5) is greater than that of the conventional reference perforate tray because a greater agitation of the gas bubbles prevents their coalescence and their direct ascent, and this increases the contact time and exchange area.

The conditions under which the tests were conducted are the following:

Operating pressure: 500 kg. per sq. cm.
Temperature: −50° C.
Catalyst concentration: 4% of $KNH_2$
Rate of flow of gas: 1,500–3,000 cubic metres per hour (brought back to normal conditions).

In the case of the conventional reference perforate tray for:

a submergence height of 5 cm. of clear liquid $NH_3$,
a tray spacing of 25 cm., with an estimated obstruction of 85%, an exchange efficiency of 0.8% has been measured, which leads to the equivalent height of 32 metres of the theoretical plate.

In these conditions of operation, the total pressure loss of the theoretical plate is 7.50 metres of water.

In the case of the stainless steel high-submergence tray according to the invention, for:

a clear liquid $NH_3$ height of 30 cm.,
a tray spacing of 80 cm., an exchange efficiency of 5% has been measured, hence the equivalent height of 16.80 metres of the theoretical plate.

The total pressure loss of 5.80 m. of water.

For a 50 cm. level of liquid, a measured efficiency of 8%, the inter-tray spacing being 1.40 metre, the equivalent height of the theoretical plate is 20 metres.

The total pressure loss is 6.50 m. of water.

Such a system has two advantages:

(1) The efficiency obtained for identical perforation and pitch to that of a conventional tray is better than the latter, as is apparent from the Example hereinafter.

(2) The diameter of the contact column in which such systems are installed can be appreciably reduced, and this is very advantageous for high-pressure exchanges, as in the above-cited examples.

A column having conventional trays as previously described and a column provided with trays as shown in FIG. 5 were compared in a $NH_3$—$(N_23H_2)$ exchange process under the operating conditions previously described. The improved tray had an overall diameter of 25 cm., the liquid discharge chutes occupied an area of 100 square cm., and the tray included seven gas distribution tubes each having a mean diameter of 2 cm. The central shaft of the column occupied 50 square cm. and the height of the perforate portion was 16 cm. When the liquid depth was 40 cm. an exchange efficiency of 13% was measured at $-30°$ C., corresponding to an equivalent height of a theoretical plate of 11 meters.

What we claim is:

1. A tray designed for use in a gas liquid column, including
    a liquid container, having a solid bottom, adapted to be mounted in substantially horizontal position within said column,
    means for conveying liquid into said container,
    outlet means communicating with said container for maintaining a selected liquid level of at least 7 cm. in said container,
    a gas feed passage having an inlet opening beneath said liquid container and an outlet opening near the level of said outlet means, and
    distribution means including a gas confining cap surrounding the outlet of said gas feed passage and a plurality of tubes each having one open end communicating with said cap and a second open end terminating near the bottom of said container, whereby gas passing through said feed passage will be released in said liquid near the bottom of said container.

2. A tray designed for use in a gas liquid column, including
    a liquid container, having a solid bottom, adapted to be mounted in substantially horizontal position within said column,
    means for conveying liquid into said container,
    outlet means communicating with said container for maintaining a selected liquid level of at least 7 cm. in said container,
    a gas feed passage having an inlet opening beneath said liquid container and an outlet opening near the level of said outlet means, and
    distribution means including a gas confining cap surrounding the outlet of said gas feed passage and a plurality of tubes, each having an open end communicating with said cap and a closed end terminating near the bottom of said container, each said tube having side walls perforated over a bottom portion of said tube whereby gas passing through said feed passage will be released in said liquid near the bottom of said container.

References Cited
UNITED STATES PATENTS

| | | | |
|---|---|---|---|
| 140,801 | 7/1873 | Van Syckel | 261—77 X |
| 699,572 | 5/1902 | Rocca | 261—114 X |
| 1,748,855 | 2/1930 | Teter. | |
| 1,806,090 | 5/1931 | Seguy. | |
| 1,858,158 | 5/1932 | Laird. | |
| 2,146,651 | 2/1939 | Prigge | 261—113 |
| 2,871,003 | 1/1959 | Galbreath | 202—158 X |
| 3,215,504 | 11/1965 | Hagbarth | 261—114 |

HARRY B. THORTON, *Primary Examiner.*

E. H. RENNER, *Assistant Examiner.*